Patented Feb. 7, 1933

1,896,244

UNITED STATES PATENT OFFICE

AUGUST MERZ, OF EAST ORANGE, NEW JERSEY, ASSIGNOR, BY MESNE ASSIGNMENTS, TO THE CALCO CHEMICAL COMPANY, INC., OF BOUND BROOK, NEW JERSEY, A CORPORATION OF DELAWARE

DYES OF THE AZINE CLASS AND MANUFACTURE THEREOF

No Drawing.   Application filed March 28, 1927.   Serial No. 179,197.

The invention relates to the manufacture of dyes, particularly dyes of the azine class and embraces a process for the manufacture of nigrosines and related products and new products first produced by the practice of the process.

Nigrosines have heretofore been manufactured by heating nitro benzene, aniline oil, and aniline hydrochloride, generally in the presence of a catalyst, such as an oxide of iron or suitable salt of iron. This has involved the use of costly aniline halogen acid salt made in a separate process; and it has been common practice to substitute for the aniline hydrochloride equivalent quantities of hydrochloric acid and aniline. The process is carried out at temperatures ranging from 160° to 210° C., and the water introduced with the aqueous acid must be removed before these temperatures can be attained. By reason of the great danger of the reaction becoming too violent with too rapid advance of temperature and otherwise, the water is removed by slow and gradual heating. The time required is itself an objection to the process from a manufacturing point of view; and the long time of heating, with the presence of the water, results in deterioration of the apparatus, by corrosion and otherwise, to an objectionable degree. One of the objects of the present invention is to provide a process for the manufacture of nigrosines which avoids the use of the costly aniline halogen acid salt and the introduction of water, together with the prolonged heating to remove the excess water, and results in a reaction which proceeds more smoothly (permitting the manufacture in larger batches than in the processes heretofore known), with material reduction of the deterioration of apparatus, and may be completed in materially less time.

The nigrosines heretofore known, including those resulting from the known processes mentioned, have been in two general forms, the alcohol or spirit soluble, and the water soluble, which is obtained from the spirit soluble by sulphonation by means of sulphuric acid under proper conditions. The nigrosines resulting from the known processes hereinabove mentioned is soluble in alcohol to a bluish black solution. In the water soluble form also it yields a bluish black. To produce substantially jet blacks it is necessary to tone the shade with other spirit soluble or water soluble dyes of yellow, orange or other shade, as may be required, but there is much difficulty to obtaining dyes having exactly the same working properties as those of the nigrosine. Furthermore, the solubility in alcohol of the spirit soluble nigrosines heretofore available (not exceeding from 6 to 8 parts of nigrosine per hundred of alcohol) is not as great as is desirable for sundry practical uses as in lacquers and stains. An object of the present invention is to provide a new variety of nigrosines soluble in alcohol more rapidly and to a much greater extent than those heretofore known and producing a more nearly jet black without the addition of other toning colors.

In addition to providing a more advantageous process for the production of dyes of the azine class and providing a dye from which solutions of high concentration may be rapidly made and substantially jet blacks of uniform working properties insured, other objects and advantages of the invention appear incidentally in connection with the following description.

I have discovered a new process which comprises heating nitrodiphenylamines with aniline oil and aniline hydrochloride or other halogen acid salt of aniline and I have further discovered that the process of making the nitrodiphenylamine and the halogen acid salt of aniline may be combined with the process of making the dye. The process comprises the heating of halogennitrobenzenes with aniline. An immediate condensation of these products sets in with the liberation of halogen acid. This acid is immediately absorbed by the excess of aniline present, resulting in the formation of aniline halogen acid salt. In place of aniline other amines may be used.

The term amine herein is used to include amido derivatives of benzene and its homologues (including orthotoluidine), diphenyl and its homologues, naphthalene and other carbon complexes of coal tar origin. The term nitrodiphenylamine is used to include diphenylamine and its homologues, and its, or their, substitution products containing one or more nitro groups. The term halogen acid is used to include the acids containing any of the halogens, such as hydrochloric, hydrobromic, etc.

In applying the process to produce the new variety of nigrosines, I prefer to heat nitro derivatives of phenyltolylamine with orthotoluidine and its hydrochloride with or without a suitable catalyst; and, for convenience and economy, I prefer to form the nitrophenyltolylamine and orthotoluidine hydrochloride simultaneously. I therefore prefer to start from chlordinitrobenzene and orthotoluidine rather than from dinitrophenyltolylamine, orthotoluidine and its hydrochloride. The details are set forth in the following examples. The formulæ given therein are in some particulars uncertain (in the present state of evidence and knowledge) and are to be taken as indicating only what seems, on the whole, the most probable of the several possible chemical explanations of the results in fact obtained.

Example I 203 parts dinitrochlorobenzene, 750 parts orthotoluidine, 20 parts iron oxide, are heated to 180°–210° C. until no water distills off. In a well conducted operation, about 72 pounds of water should be distilled off. At the same time, a certain amount of orthotoluidine is also driven off. The latter amount depends on the speed with which the reaction is carried out. Under favorable conditions, the amount of orthotoluidine which distills off is twenty-five to fifty parts, but in any event, the portion distilling off may be recovered. A certain amount of ammonia is also driven off in the reaction. This gradually diminishes as the reaction nears completion. On cooling, the product is a brittle, black, shiny mass which may be pulverized, and extracted with water and hydrochloric acid. The extract is a solution of a yellowish brown dye similar to phosphine. This may be recovered by salting in combination with zinc chloride or by other suitable means. The residue from the extraction is a black mass, which on being dried dissolves in alcohol to a substantially jet black solution. The product will dissolve to the extent of 30 pounds in 12 gallons of alcohol as contrasted with 6 to 8 pounds in a like quantity which is the extent of the solubility of the products heretofore available.

The formulas of this Example I may be expressed as follows:

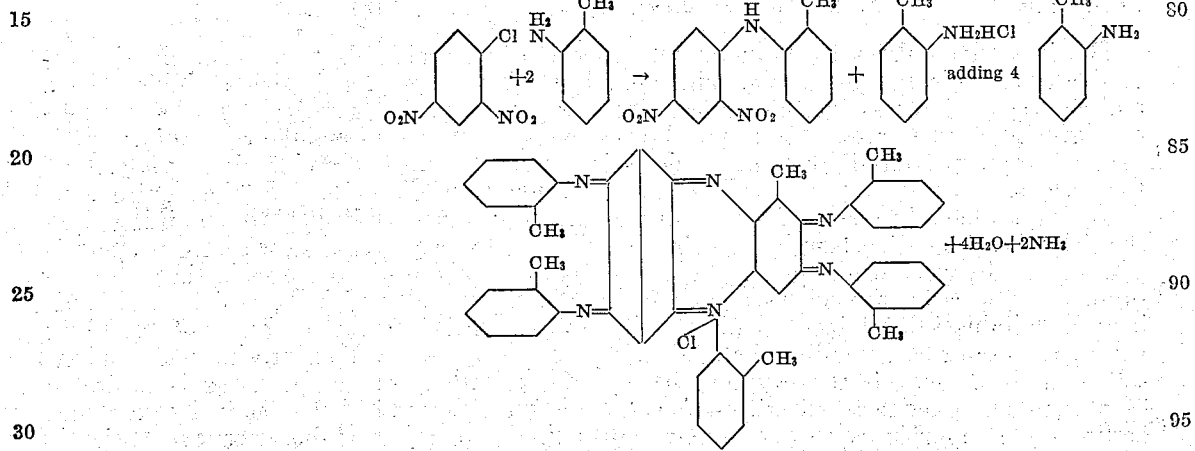

The illustrated formula applies to any isomer with at least one nitro group ortho to the chlorine; in these cases substituting groups in the new compound will occupy the same relative positions as they occupied in the original components.

Example II 203 parts dinitrochlorbenzene, 550 parts orthotoluidine, 20 parts iron oxide, are heated to 205°–210° C. until no more water is distilled off. Continue heating at this temperature five hours. The residue is ground, and extracted with water and acid as before. The extract is dark brown and fluorescent. The residue, dried in the usual manner, yields a black mass soluble in alcohol practically the same as in the previous example.

The formula given under Example I illustrates the reaction in Example II except that the smaller amount of orthotoluidine probably results in a product having only four iminotolyl groups instead of the five shown in the formula given.

Example III 203 parts dinitrochlorbenzene, 1000 parts orthotoluidine, 20 parts iron oxide, were heated rapidly to 190°. Active reaction set in, which continued for a short time without further heat. Heating was then resumed, and continued for about 10 hours. Mass was extracted with water and acid. The residue was freely soluble in alcohol, yielding a jet black solution.

The formula given under Example I is applicable, and excess orthotoluidine being used to keep the mass of reaction more thinly fluid.

Example IV 100 parts by weight of the spirit soluble dye obtained in the foregoing examples, 400 parts 20% fuming sulphuric acid, were digested at room temperature for 10–12 hours. The mass was poured into cold water, and washed to remove excess acid. The residue was dissolved with caustic soda solution, and evaporated to dryness. In lieu of fuming sulphuric acid, chlorsulphonic acid, or other suitable sulphonating agent, may be used. The product so obtained is glistening black granular mass, dissolving in water to a black solution. This product dyes wool and leather by the usual methods a substantially jet black similar to the shades ordinarily obtained from nigrosines toned with yellow or orange. When dyed in light shades for greys, much more satisfactory shades are obtained than is possible with the mixtures of the usual blue black nigrosines with toning colors.

Other examples of the process of the invention illustrating variations in detail suited to various conditions and purposes are:—

Example V 259 parts of dinitrodiphenylamine, 372–750 parts of aniline, 130 parts of aniline hydrochloride, 20 parts of iron oxide, are heated to 180°–210° C. until all the water of condensation has distilled off, and the product of reaction has attained the desired shade as shown by a solution of a test portion in alcohol. On shorter heating, the product will be reddish in cast, whereas on more prolonged heating, the shade will be bluer, and free from the red tone. The quantity of product resulting is also somewhat greater when the heating has been prolonged. This requires a heating of from two to ten hours or more. On cooling, the product will be a more or less brittle mass, depending on the amount of analine used. The excess aniline may be removed by distillation with steam after rendering the mass alkaline, or by extraction with dilute hydrochloric acid. The product thus obtained is dried. In this form, it is suitable for use as an alcohol soluble dye.

The formula given under Example I omitting the first step, when all $CH_3$ groups are eliminated therefrom, sufficiently indicates the reactions in this Example V.

Example VI 203 parts of chlordinitrobenzene, 465–750 parts of aniline, 20 parts of iron oxide, are treated as described in Example V. The resulting product is identical.

The formula given under Example I when all $CH_3$ groups are eliminated therefrom, illustrates the reactions in this Example VI.

Example VII 100 parts by weight of product obtained by Examples V or VI, 400 parts by weight of concentrated sulphuric acid, are heated to 50°–80° C. until a test portion is completely soluble in dilute alkali or ammonia. The mass is then poured into cold water, and freed from most of the excess acid by leaching with cold water. The dye in this state is sparingly soluble. When sufficiently washed, the residue is dissolved in the proper amount of alkali or other suitable neutralizing agent, which will render the dye soluble. The resulting solution is then evaporated to dryness. The product so obtained is a water soluble dye. Its solution in water is black like nigrosine, dyeing wool and leather a good black.

Example VIII 203 parts by weight of chlordinitrobenzene, 600 to 1000 parts by weight of xylidine, 20 parts of iron oxide, are heated to 180°–210° C. for the requisite time. The further treatment is as in Example V. The color obtained yields a solution in alcohol a greenish black. The filtrates from the acid extraction are decidedly brownish, due to a phosphine like dye, which dyes leather or tannin mordanted cotton a brown color.

The formula given in Example I illustrates the reactions in this Example VIII except that the xylidine has an additional $CH_3$ group which appears throughout.

Example IX 203 parts of chlordinitrobenzene, 715 parts of alpha naphthylamine, 20 parts of iron oxide, are heated 4–6 hours at 160°–180° C. The product of reaction is extracted with water and hydrochloric acid. The residue yields a dye which dissolves in alcohol to a bluish red solution. On sulphonation with 20% fuming sulphuric acid, and further treatment as in Example VII, it yields a water soluble dye, dyeing wool a bluish red color.

The formula of Example IX is substantially illustrated by the formula given under Example I except that naphthyl groups are substituted for tolyl groups.

Example X 518 parts of tetranitrodiphenylbenzidine, 260 parts of aniline hydrochloride, 2000 parts of aniline, 20 parts of iron oxide, are heated to 180°–190° C. for 12 hours. The resulting melt, extracted with acid and water, yields a product dissolving in alcohol to a black solution. On sulphonation, a black dye, whose alkali salts are water soluble, is obtained.

The formula here is substantially illustrated by the formula given under Example V except that in Example X two of the dinitrodiphenylamine molecules are linked together to form tetramitrodiphenylbenzidine and the resulting product is a double molecule consisting of two of the molecules of Example V linked together. This formula of Example X may be expressed as follows:

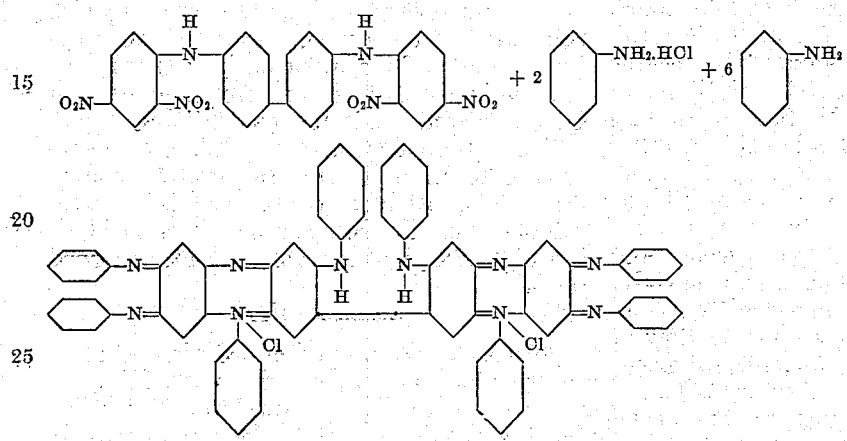

The particular materials mentioned in the examples given may be replaced by substitutes within the general principles of the invention and I do not limit myself to particular materials, except as pointed out in the following claims.

I claim:

1. A process for making dyes comprising condensing a condensation product of chloronitrobenzene and aniline with an aromatic monamine and a halogen acid salt of an aromatic monamine.

2. A process for making dyes comprising condensing a condensation product of chlornitrobenzene and aniline with an aromatic monamine and a hydrochloride of a aromatic monamine.

3. A process for making dyes comprising condensing a chlornitrobenzene with more than two molecular proportions of primary aromatic monamine.

4. A process for making dyes comprising condensing a chlordinitrobenzene with more than two molecular proportions of primary aromatic monamine.

5. A process for making dyes soluble in alcohol comprising the step of heating halogennitrobenzene with more than two molecular proportions of aniline.

6. A process for producing water-soluble dyes comprising condensing a nitro product of chlorbenzene with an amine and sulphonating the product with sulphuric acid of suitable concentration.

7. A process for making dyes comprising heating a halogennitrobenzene and an amine to about 180°–210° C. until the water of condensation has distilled off and a sample of the product of reaction dissolved in alcohol is free from a red tone, separating a reaction dye product from accompanying materials and drying.

8. A process for making dyes comprising heating a halogennitrobenzene and an amine in the presence of a suitable catalyst to about 180°–210° C. until the water of condensation has distilled off and a sample of the product of reaction dissolved in alcohol is free from a red tone, separating the reaction dye product from accompanying materials and drying.

9. As a new article of manufacture, a dye of the azine class resulting from a condensation process dyeing, porous material a substantially jet black shade without the addition of other toning colors and soluble in alcohol to the extent of more than ten parts of the dye per hundred of alcohol.

10. As a new article of manufacture, a dye of the azine class resulting from a condensation process, dyeing porous material a substantially jet black shade without the addition of other toning colors and soluble in alcohol.

11. As a new article of manufacture, a dye of the azine class, obtained by sulphonation of the black product of a condensation process, dyeing porous material a substantially jet black shade without the addition of other toning colors and soluble in water.

12. As a new article of manufacture, a dye obtained by the condensation of chlordinitrobenzene with at least five chemical equivalents of orthotoluidine to one of chlordinitrobenzene and soluble in alcohol.

13. As a new article of manufacture, a black dye of the azine class comprising a molecule of a phenazine with a methylic group attached thereto.

14. As a new article of manufacture, a black dye of the azine class comprising a molecule of a phenazine with a plurality of iminotolyl groups attached thereto.

15. As a new article of manufacture, a black dye of the azine class comprising a molecule of a methyl phenazine with a plurality of iminotoyl groups attached thereto.

16. As a new article of manufacture, a black dye of the azine class comprising a molecule of a dimethyl phenazine with a plurality of iminotolyl groups attached thereto.

17. A process for making dyes comprising condensing chlornitrobenzene with more than two molecular proportions of primary aromatic monamine, extracting the condensation product with water and hydrochloric acid leaving as the residue a black alcohol-soluble dye, and salting out the material extracted to recover a brown water-soluble dye.

AUGUST MERZ.

CERTIFICATE OF CORRECTION.

Patent No. 1,896,244.  February 7, 1933.

AUGUST MERZ.

It is hereby certified that error appears in the printed specification of the above numbered patent requiring correction as follows: Page 1, line 49, for "nigrosines" read "nigrosine"; page 2, line 47, for "dinitrochlorobenzene" read "dinitrochlorbenzene"; page 3, line 4, for "and" read "the"; page 4, line 7, for "tetramitrodiphenylbenzidine" read "tetranitrodiphenylbenzidine"; and lines 37 and 38, claim 1, for "chloronitrobenzene" read "chlornitrobenzene"; page 5, line 1, claim 15, for "iminotoyl" read "iminotolyl"; and that the said Letters Patent should be read with these corrections therein that the same may conform to the record of the case in the Patent Office.

Signed and sealed this 16th day of May, A. D. 1933.

M. J. Moore.

(Seal) Acting Commissioner of Patents.